Figures 1, 2:
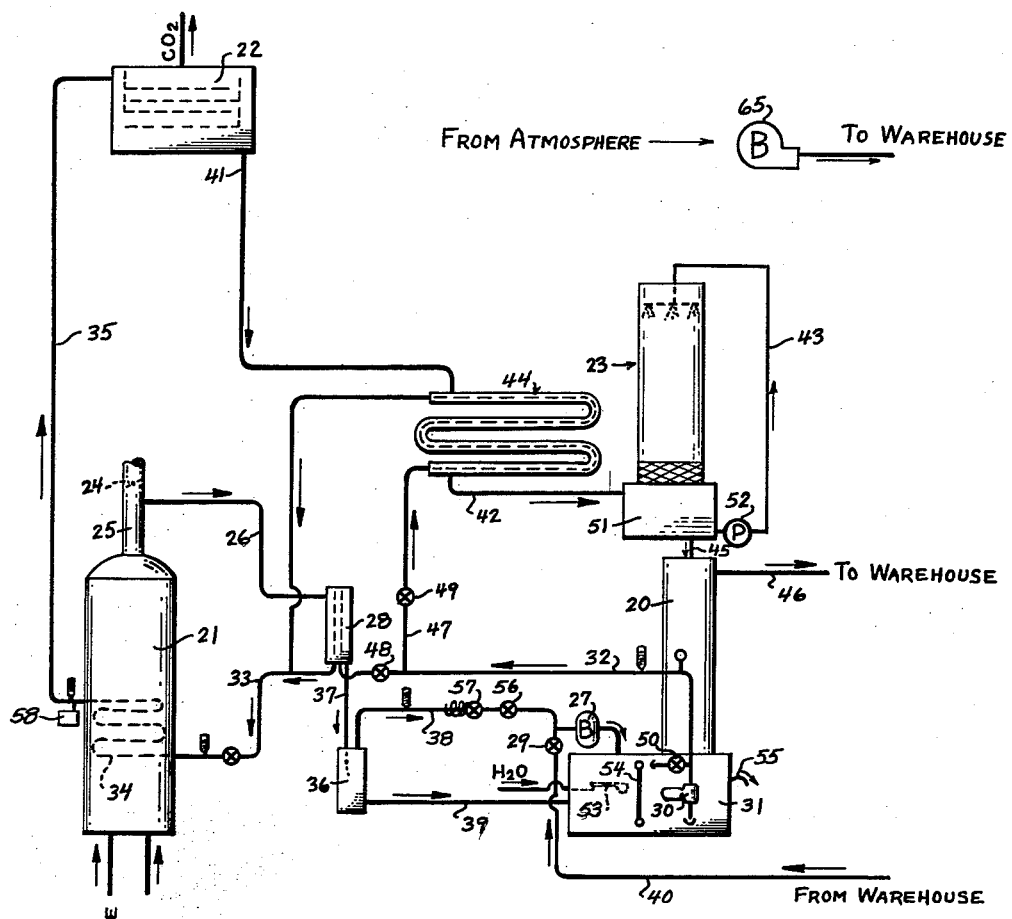

INVENTOR.
BERT N. ROBINSON
BY Barnes + Seed
ATTORNEYS

United States Patent Office 3,107,171
Patented Oct. 15, 1963

3,107,171
PROCESS FOR CONTROLLING WAREHOUSE ATMOSPHERE
Bert N. Robinson, Mercer Island, Wash., assignor to W. E. Stone & Co., Inc., Seattle, Wash., a corporation of Washington
Filed July 5, 1960, Ser. No. 40,623
7 Claims. (Cl. 99—154)

The present invention relates to a process for controlling the atmosphere of a warehouse used for storing apples or other produce.

It has been established that the quality of apples after a prolonged storage season will be improved if the warehouse is sealed and an atmosphere low in oxygen is maintained therein, the most effective amount of oxygen varying somewhat from one variety of apple to another. The process of fruit respiration converts oxygen into carbon dioxide and, since the warehouse is sealed, this carbon dioxide must be removed. Closely related to this problem is the fact that such respiration cannot be relied upon to reduce the amount of oxygen by conversion to carbon dioxide to the desired level in a short enough length of time for optimum storage results.

Accordingly, the present invention aims to provide an efficient and effective process having the dual purpose of reducing the oxygen level in a warehouse rapidly and controlling the carbon dioxide and oxygen levels therein throughout the storage season on a substantially automatic basis.

With the above and other more particular objects and advantages in view and which will appear and be understood in the course of the following description and claims, the invention consists in the novel construction and in the adaptation and combination of parts hereinafter described and claimed.

In the accompanying drawing:

FIG. 1 is a schematic view illustrating the arrangement of typical apparatus for carrying out the process of the present invention; and FIG. 2 is a wiring diagram of the control system operated by the oxygen analyzer.

As disclosed in United States Patent No. 2,923,629, issued February 2, 1960, it has been recognized in the ripening control art that a circuit having a carbon dioxide absorption or scrubbing tower together with a heater and a carbon dioxide collector or stripper through which a suitable depurating solution is cycled can be used to remove carbon dioxide from warehouse atmosphere circulated through the stripper. Furthermore, it has been well known that an aqueous solution of sodium carbonate and/or monecthanalimine is a very satisfactory carbon dioxide depurating solution since both of these chemicals combine with carbon dioxide when cold and release it when hot. Thus, in such a carbon dioxide depurating cycle, cool depurating solution is passed down through the scrubbing tower to absorb carbon dioxide from the atmosphere being blown up through the tower, then is pumped through a heater to raise its temperature past the boiling point of carbon dioxide, and finally passes through a stripper from whence the carbon dioxide boils off leaving pure depurating solution to be recycled after being cooled by a suitable cooling unit.

The present invention includes such a carbon dioxide depurating cycle, the scrubbing tower, heater, stripper, and cooling unit being designated by numerals 20-23, respectively. However, the heater takes the form of a boiler fired by a carbonaceous fuel which will generate nitrogen, carbon dioxide and water as the products of combustion with air. More particularly, I prefer to use propane as the boiler fuel and such produces flue gas containing about 12 parts of nitrogen, 3 of carbon dioxide, and 1.6 parts of water for 1 unit of propane. The air adjustment in the boiler is made to provide a small excess of air to obtain complete combustion with no carbon monoxide.

The flue gas is selectively by-passed from the stack through a line 26 under the suction of a blower 27. Normally, the flue gas output from the boiler will considerably exceed that desired to be by-passed. If not, a damper 24 may be provided to throttle the stack when flue gas is to be drawn by the blower 27. Between the boiler and this blower 27 the hot flue gas passes through a heat exchanger 28 wherein it is cooled by depurating solution while such is flowing under action of a pump 30 from the sump 31 of the scrubbing tower 20 through piping 32—33 to the coils 34 of the boiler 21 and from thence as a hot solution to the stripper through pipe 35. From the heat exchanger 28 the cooled flue gas travels downwardly into a condensate trap 36 by a line 37 and thence by line 38 to the blower 27. The water condensing from the cooled flue gas discharges from the trap 36 through pipe 39 to the sump 31. However, the water level in the trap is maintained high enough to prevent gas back flow from the scrubber 20.

It will be noted that the flue gas line 38 is intersected adjacent the suction side of the blower 27 by a gas line 40 leading from the warehouse. Thus the blower 27 pulls a mixture of flue gas and warehouse air into the base of the scrubbing tower 20. The ratio of warehouse air to flue gas is controlled by throttling a valve 29 in the line 40. As this mixture travels upwardly in the tower in counterflow, to depurating solution entering the top by gravity flow from the stripper 22 via pipe 41, heat exchanger 44, pipe 42, cooler 23 and pipe 45, the mixture is freed of carbon dioxide. Accordingly, gas blown from the scrubber 20 to the warehouse through the return line 46 contains an excess of nitrogen derived from the boiler flue gas. This excess nitrogen displaces an equal amount of warehouse atmosphere which vents to the outside atmosphere through a suitable damper in the wall of the warehouse, and hence lowers the oxygen contact in the warehouse.

Returning to the cycle of the depurating solution, it will be noted that the cool carbon dioxide-rich solution in the sump 31 of the scrubber is not only pumped through the heat exchanger 28 to cool the flue gas from the boiler, but is also pumped through the heat exchanger 44 by a pipe 47 to aid the cooling unit 23 in cooling the carbon dioxide-free solution discharging from the stripper 22. It will be noted that the heat exchangers 28, 44 are in parallel and flow of the carbon dioxide-rich solution therethrough can be controlled by valves 48—49. The first of these valves is throttled such that the flue gas is cooled in the heat exchanger 28 to approximately 90° F. while the valve 49 is throttled so as to cool the carbon dioxide-free solution to about 110° F. before it reaches the cooling unit 23. Excess solution from the pump 30 not needed for the two heat exchangers is by-passed back into the sump 31 by means of a valve 50.

The strong solution from the heat exchangers unites in pipe 33 prior to entry into the boiler tubes 34, and the boiler 21 should have the capacity to heat the solution to its boiling point (about 212° F.). An aquastat 58 controls the discharge temperature of the solution out of the boiler. The hot solution flows upwardly through the pipe 35 to the stripper 22 in which the carbon dioxide boils off. Sufficient height is given the stripper 22 above the top of the scrubbing tower 20 to maintain flow by gravity therebetween. The cooler 23 may take the form of a cooling tower into the sump 31 of which the line 42 from the heat exchanger 44 empties and from which the line 45 leads for gravity flow to the scrubbing tower 20. A pump 52 circulates the carbon dioxide-free solution from the sump 31 through a bypass 43 to the head of the cooling tower from which it sprays to the sump to effect cooling of the solution to about 80° F. by evaporation of water therefrom. The water vapor discharges to the atmosphere through openings at the base of the tower.

Since water will be evaporated in the scrubber, stripper, and cooling tower additional water is supplied through a constant level float valve 53 in the sump 31. A gauge glass 54 is provided to check the quantity of solution in the sump and the latter is also equipped with an overflow 55 so excess solution can be wasted to protect the blower 27.

After the oxygen in the warehouse has been reduced to the proper level, the nitrogen source, and namely the flue gas, may be manually turned off by closing a valve 56 in the blower suction line 38. Proper temperature of the depurating solution at the outlet of the boiler coil 34 remains in the control of the boiler's aquastat 58.

In addition to the valve 56, the blower suction line 38 has a motorized valve 57 controlled by the flame controls of the boiler 21 so that said line is automatically closed when the flame is off. This prevents outside air from being pulled by the blower 27 down through the boiler stack 25.

For fully automatic control of the oxygen contact of the warehouse between predetermined upper and lower limits, an oxygen analyzer 60 may be placed in the warehouse and set to selectively control two electrical circuits by a pair of relays 61—62 as shown in FIG. 2. Relay 61 energizes a circuit 63 which includes the motorized valve 57 in series with a switch controlled by the aquastat 58 so as to be closed and open when the boiler flame is on and off, respectively. The analyzer 60 completes the circuit through lead 64 to relay 63 when the oxygen content of the warehouse is above the present upper limit and opens such circuit when the oxygen content has been reduced below such level.

Once the oxygen content of the warehouse has been reduced it is possible for the respiration of the fruit to lower it too far, and hence I install an auxiliary blower 65 for selectively delivering outside air into the warehouse. This blower is activated by a circuit 66 which is energized by the relay 62 when the oxygen analyzer 60 detects the preset lower oxygen limit and responsively completes the relay circuit through lead 67. When the oxygen level approaches the preset upper limit the oxygen analyzer opens the circuit for relay 62 to shut off the blower 65.

Thus it is seen that once the system is set it will initially rapidly reduce the oxygen level in the warehouse by the use of the nitrogen derived from the boiler flue gas and thereafter control the carbon dioxide and oxygen levels therein throughout the storage season. This latter is performed on an automatic basis requiring only occasional supervision.

The invention should be clearly understood from the foregoing detailed description of my now-preferred illustrated embodiment. Changes in the details of construction can be resorted to without departing from the spirit of the invention and it is accordingly my intention that no limitations be implied and that the hereto annexed claims be given the broadest interpretation to which the employed language fairly admits.

What I claim is:

1. In a process for reducing the oxygen content of the atmosphere in a given closed vent-equipped produce storage compartment to a predetermined low level to retard respiration of the produce, burning a carbonaceous fuel in the presence of air of sufficient quantity for complete combustion to gaseous products comprising carbon dioxide, nitrogen and water, depurating the gas mixture by absorbing the carbon dioxide therefrom by a depurating solution, heating said depurating solution by said burning to boil off the absorbed carbon dioxide, cooling and recycling the depurating solution, and forcing the depurated gas mixture into the storage compartment to thereby displace storage compartment atmosphere and reduce the oxygen content of said compartment.

2. In a process for controlling the oxygen and carbon dioxide content of the atmosphere in a given closed vent equipped produced storage compartment at predetermined low levels to retard respiration of the produce, burning propane to produce a gas mixture of carbon dioxide, nitrogen and water, condensing said water, absorbing said carbon dioxide by a depurating solution, heating said depurating solution by said burning to boil off the absorbed carbon dioxide, cooling and recycling the depurating solution, and forcing said nitrogen into the storage compartment to thereby displace storage compartment atmosphere and reduce the oxygen content of said compartment.

3. In a process for controlling the oxygen and carbon dioxide content of the atmosphere in a given closed vent-equipped produce storage compartment at predetermined low levels to retard respiration of the produce, burning a carbonaceous fuel in the presence of air of sufficient quantity for complete combustion to gaseous products including nitrogen, circulating said nitrogen into the storage compartment to thereby displace storage compartment atmosphere and reduce the oxygen content of said compartment, depurating atmosphere from the storage compartment by absorbing the carbon dioxide therefrom by a depurating solution, heating said depurating solution by said burning to boil off the absorbed carbon dioxide, cooling and recycling the depurating solution, and recirculating the depurated gas into the storage compartment.

4. In a process for controlling the oxygen and carbon dioxide content of the atmosphere in a given closed vent-equipped produce storage compartment at predetermined low levels to retard respiration of the produce, burning a carbonaceous fuel in the presence of air of sufficient quantity for complete combustion to gaseous products including nitrogen and water, depurating atmosphere from the storage compartment by absorbing the carbon dioxide therefrom by a depurating solution, passing a portion of said depurating solution in heat exchange relationship with said gaseous products of combustion to condense water therefrom, heating said depurating solution by said burning to boil off the absorbed carbon dioxide, cooling and recycling the depurating solution, recirculating the depurated gas into the storage compartment, and circulating said nitrogen into the storage compartment to thereby displace storage compartment atmosphere and reduce the oxygen content of said compartment.

5. In a process for controlling the oxygen and carbon dioxide content of the atmosphere in a given closed vent-equipped produce storage compartment at predetermined low levels to retard respiration of the produce, burning a carbonaceous fuel in the presence of air of sufficient quantity for complete combustion to gaseous products including nitrogen and water, condensing said water, depurating atmosphere from the storage compartment by absorbing the carbon dioxide therefrom by a depurating solution, heating said depurating solution by said burning to boil off the absorbed carbon dioxide, cooling and recycling the depurating solution, said cooling being partly performed by passing the depurating solution in heat exchange relationship with part of the depurating solution which has absorbed carbon dioxide and is flowing toward said burning, recirculating the depurated gas into the storage compartment, and circulating said nitrogen into the storage compartment to thereby displace storage compartment atmosphere and reduce the oxygen content of said compartment.

6. In a process for controlling the oxygen and carbon dioxide content of the atmosphere in a given closed vent-equipped produce storage compartment at predetermined low levels to retard respiration of the produce, burning a carbonaceous fuel in the presence of air of sufficient quantity for complete combustion to gaseous products including nitrogen, circulating said nitrogen into the storage compartment when the oxygen content thereof is above a predetermined upper limit until sufficient warehouse atmosphere has been displaced to lower said oxygen content below said upper limit, depurating atmosphere from the storage compartment by absorbing the carbon dioxide therefrom by a depurating solution, heating said depurating solution by said burning to boil off the absorbed carbon dioxide, cooling and recycling the depurating solution, recirculating the depurated gas into the storage compartment, and circulating outside air into said compartment when the oxygen content is below a predetermined lower limit until said oxygen content is raised above said lower limit.

7. In the process for reducing the oxygen content of the atmosphere in a given closed vent-equipped produce storage compartment to a predetermined low level to retard respiration of the produce, oxidizing a carbonaceous fuel in air to produce heat and a gas mixture comprising carbon dioxide, nitrogen and water, depurating said gas mixture by absorbing the carbon dioxide therefrom by an absorbent, heating said absorbent by said heat to remove the absorbed carbon dioxide therefrom, cooling and re-using said absorbent, and forcing the depurated gas mixture into the storage compartment to thereby displace storage compartment atmosphere.

References Cited in the file of this patent

UNITED STATES PATENTS 2,923,629     Bonomi _____ Feb. 2, 1960
2,955,940     Williams _____ Oct. 11, 1960